(12) United States Patent
Coxsey

(10) Patent No.: US 8,800,489 B2
(45) Date of Patent: Aug. 12, 2014

(54) AUGER-OPERATED DEER FEEDER

(76) Inventor: Don Coxsey, Sanger, TX (US)

( * ) Notice: Subject to any disclaimer, the term of this patent is extended or adjusted under 35 U.S.C. 154(b) by 51 days.

(21) Appl. No.: 13/226,497

(22) Filed: Sep. 7, 2011

(65) Prior Publication Data

US 2013/0055956 A1  Mar. 7, 2013

(51) Int. Cl.
*A01K 5/02* (2006.01)

(52) U.S. Cl.
USPC ............. 119/51.11; 119/57.91; 119/57.92

(58) Field of Classification Search
USPC ........ 119/51.11, 57.2, 57, 57.1, 57.91, 57.92, 119/61.2
See application file for complete search history.

(56) References Cited

U.S. PATENT DOCUMENTS

| | | | | | |
|---|---|---|---|---|---|
| 3,376,856 | A | * | 4/1968 | Crippen | 119/56.1 |
| 3,962,997 | A | * | 6/1976 | Ruth | 119/51.11 |
| 4,401,057 | A | * | 8/1983 | Van Gilst | 119/57.4 |
| 4,508,061 | A | * | 4/1985 | Swearingin | 119/51.01 |
| 4,665,862 | A | * | 5/1987 | Pitchford, Jr. | 119/51.11 |
| 4,722,301 | A | * | 2/1988 | Strong | 119/57.4 |
| 4,850,307 | A | * | 7/1989 | Sheets | 119/57.2 |
| 4,964,535 | A | * | 10/1990 | Curwen | 222/67 |
| 4,987,859 | A | * | 1/1991 | Vanderzanden | 119/57.7 |
| 5,150,666 | A | * | 9/1992 | Momont et al. | 119/57.91 |
| 5,230,300 | A | * | 7/1993 | Mezhinsky | 119/51.11 |
| 5,299,529 | A | * | 4/1994 | Ramirez | 119/51.11 |
| 5,363,805 | A | * | 11/1994 | Wing | 119/51.11 |
| 5,555,842 | A | * | 9/1996 | Chocol et al. | 119/51.11 |
| 5,605,113 | A | * | 2/1997 | Krehl | 119/57.92 |
| 5,626,095 | A | * | 5/1997 | Runion | 119/57.2 |
| 5,724,912 | A | * | 3/1998 | Cull | 119/57.2 |
| 5,784,996 | A | * | 7/1998 | Krehl | 119/57.92 |
| 6,082,299 | A | * | 7/2000 | Halford | 119/51.04 |
| 6,135,056 | A | * | 10/2000 | Kuo | 119/51.11 |
| 6,263,833 | B1 | * | 7/2001 | Runyan et al. | 119/51.11 |
| 6,367,417 | B1 | * | 4/2002 | Gal et al. | 119/51.5 |
| 6,401,657 | B1 | * | 6/2002 | Krishnamurthy | 119/51.11 |
| 6,487,987 | B1 | * | 12/2002 | Choi | 119/51.5 |
| 6,758,163 | B1 | * | 7/2004 | Sternitzky | 119/51.11 |
| 7,523,717 | B2 | * | 4/2009 | Nicholes | 119/51.01 |

* cited by examiner

*Primary Examiner* — Yvonne Abbott
(74) *Attorney, Agent, or Firm* — Norred Law, PLLC; Warren V. Norred

(57) ABSTRACT

The present invention is a game feeder that employs a confined auger to convey game feed from a hopper to a desired feed location. In this invention, the auger's flightings protect unreleased stored feed from the reach of animals.

9 Claims, 4 Drawing Sheets

AUGER-OPERATED DEER FEEDER

CROSS-REFERENCE TO RELATED APPLICATIONS

Figure 1:
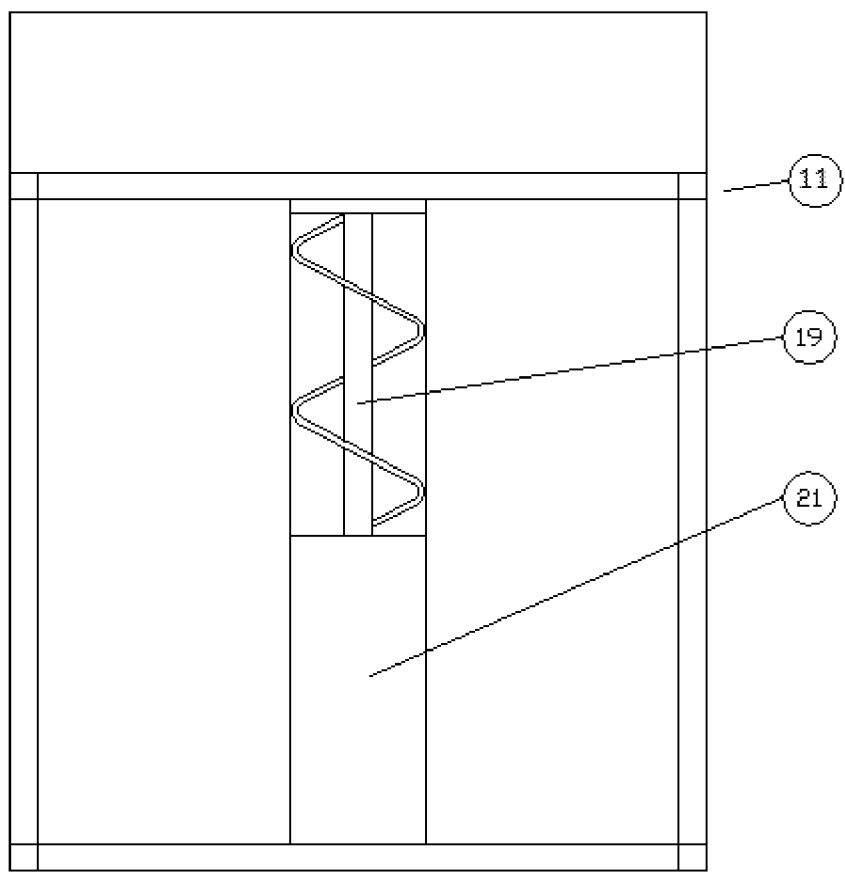

None.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF THE MATERIAL ON THE COMPACT DISC None.

BACKGROUND OF THE INVENTION (1) Field of the Invention

The invention is an automated deer and game feeder.

(2) Description of the Related Art including information disclosed under 37 CFR 1.97, 1.98.

The hunting industry has developed many sorts of feeders to attract wild animals and provide sustenance for them when more natural sources of food are less available. Typically, these feeders are placed near an area where the targeted animals travel, and dispense food on a regular schedule. They are powered by batteries and solar panels, and controlled with timers. The most common devices use a raised tripod to lift a hopper containing 55 gallons of feed, often holding 400 pounds or more. In a typical construction, the hopper has a portal at its bottom which, when opened, allows the material to feed by gravity to a rotating spreader. A controller is typically part of the system that opens the portal on a preset schedule. The spreader often includes a spinning element beneath the portal opening to spread the feed on the ground in a small area beneath and surrounding the feeder location, which encourages the animals drawn to the area to feed peacefully without fighting over a single pile of food.

These feeders tend to be notoriously unreliable. To feed them, one must place the feed in the top of the hopper, which can be more than eight feet high off of the ground, or lower the hopper to the ground using a winch system often incorporated into the feeder construction. The feed often develops bridging problems as the feed compresses at the bottom, and ceases to fall from the hopper opening. The tripod holding the assembly above the ground can be damaged by the animals drawn to the area, resulting in the feeder falling to the ground and the feed spilled.

What is needed is a way of eliminating bridging in game feeders, is mounted much lower to the ground, and reliably delivers feed.

BRIEF SUMMARY OF THE INVENTION

The invention is a game feeder constructed with a V-shaped trough of feed that employs an auger to convey feed from the trough to release feed to the ground beneath the feeder.

Objects of the invention include a feeder construction that:
a) eliminates feed bridging,
b) can withstand aggressive contact with animals feeding nearby,
c) has few moving parts, and
d) secures feed from squirrels and raccoons attempting to steal feed.

BRIEF DESCRIPTION OF THE SEVERAL VIEWS OF THE DRAWING(S)

FIG. 1—Top view of the housing and one embodiment of the invention.

Figure 2:
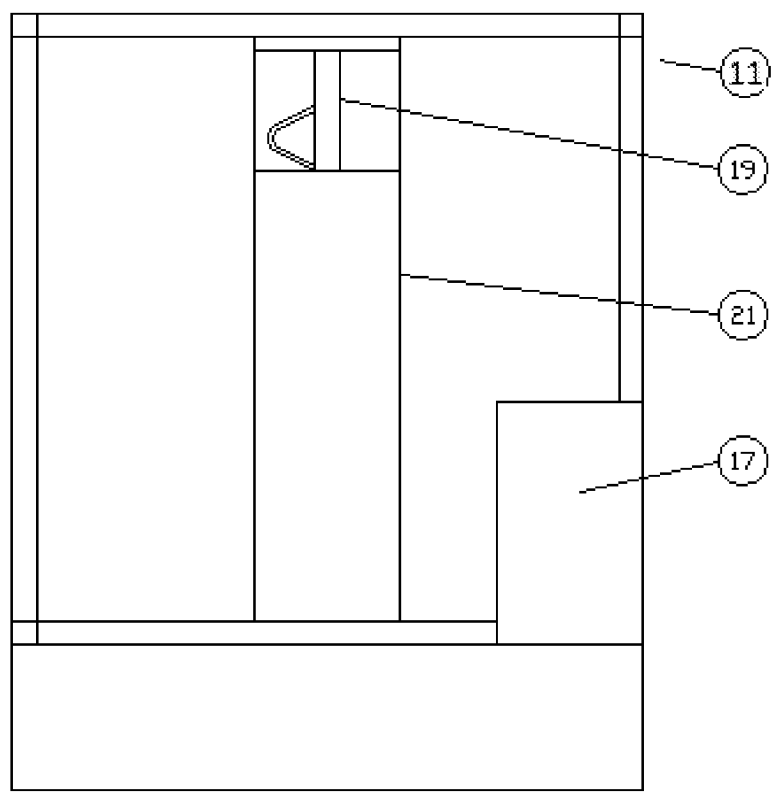

FIG. 2—Bottom view of the housing of one embodiment of the invention.

Figure 3:
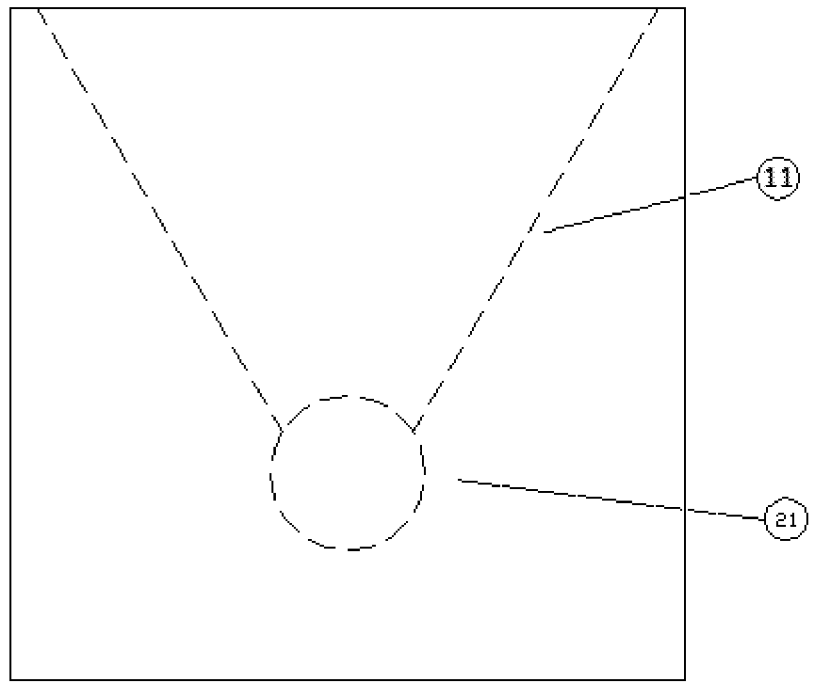

FIG. 3—Front view of the housing of one embodiment of the invention.

Figure 4:
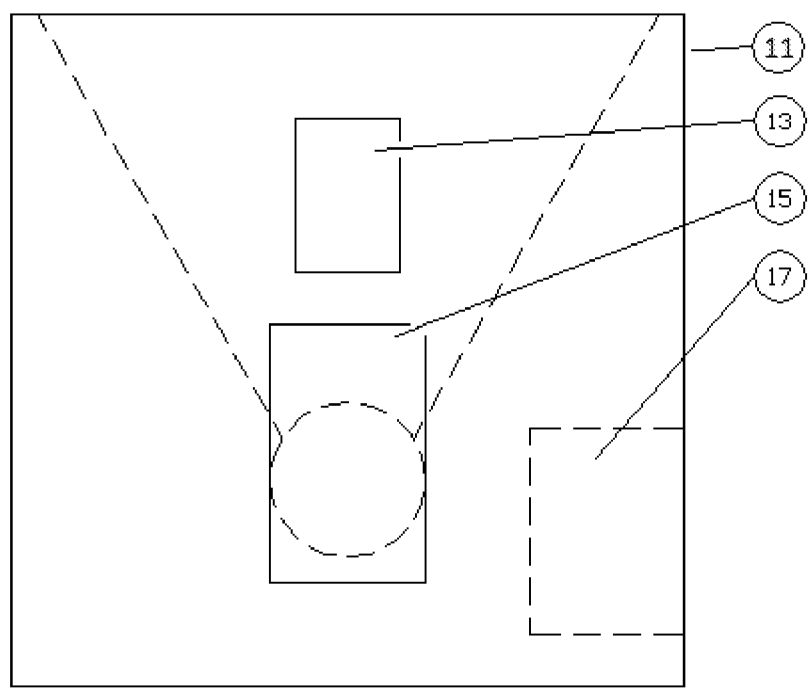

FIG. 4—Back view of the housing of one embodiment of the invention, showing motor/gear box assembly, battery and controller.

Figure 5:
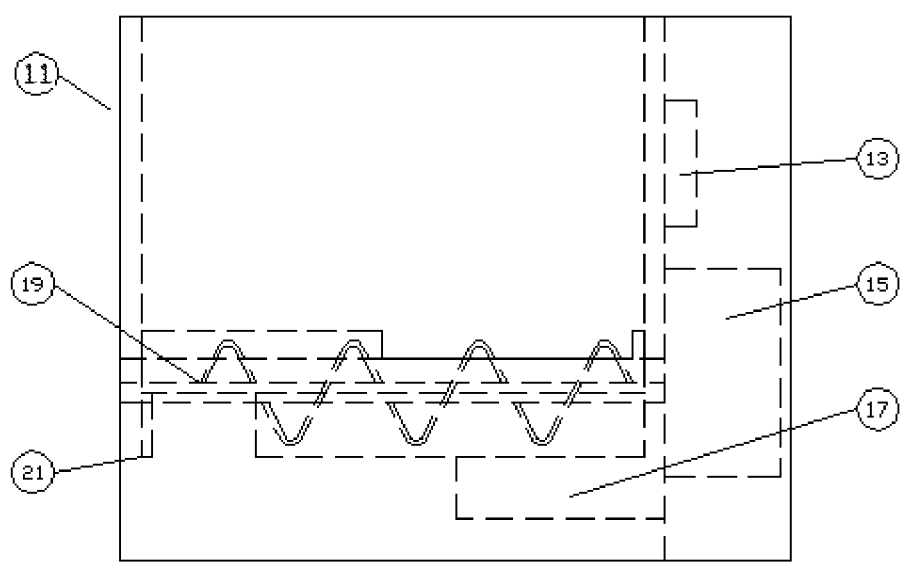

FIG. 5—Side view of one embodiment of the invention.

DETAILED DESCRIPTION OF THE INVENTION

According to the present invention, the foregoing objects and other advantages are attainted by a deer feeder constructed as follows.

The invention will typically hold feed in a trough or hopper 11. In FIGS. 1-4, the hopper is a V-shaped trough 11, but any funneling shape would suffice, so long as the hopper has a substantial opening that is large enough that no bridging of material within is possible.

FIG. 3 is a front view of the invention as currently built, showing one embodiment of the invention, including an external housing, a V-shaped hopper 11 and the relative position of the material flow tube 21.

FIG. 1 shows a top view of a material flow tube 21, which sits at the bottom of the V-shaped feed hopper 11. An auger screw 19 can be partially seen through an orifice at one end of the hopper 11. Material is conveyed by the auger screw 19 as it turns inside the material flow tube 21. The orifice allows feed to drop through the hopper 11 into the flighting of the auger 19.

In FIG. 2, a bottom view of the hopper shows the other end of the auger 19, as revealed by an exit orifice in the flow tube 21 at the opposite end of the entrance orifice. One of the advantages of this invention is that no other door or means of closing the hopper's bottom opening is necessary. This figure also shows a possible placement of the battery pack 17 used to power the motor.

The feed enters the flow tube 21 at the top entrance orifice, is carried by movement of the auger 19 when actuated, and exits the flow tube 21 at the bottom of the other end of the flow tube 21. FIG. 4 shows the placement of the motor and gear box assembly 15 that turns the auger 19, mounted on the end of the external wall of the hopper 11. In the current embodiment of the invention, a programmable controller 13 is mounted on the external wall of the hopper 11 and powers the motor 15 which actuates the auger 19 at a user-determined schedule. The entire assembly is powered by a battery 17 stored in the hopper housing. Other embodiments could place the controller 13 and battery 17 anywhere on the device that is protected from animals.

FIG. 5 is a side-view of the auger screw 19, flow tube 21, hopper 11, and shows the relative sizes and flow tube orifices. The auger screw 19 moves the feed from the hopper 11 to the opening at the bottom of the hopper 11 at the auger's other end. The auger 19 inherently protects the feed remaining within the hopper 11, as the augur's flightings provide a barrier separating the animals from the food kept within.

Game feed comes in many sizes and shapes. Larger-shaped feed pieces are less expensive than smaller pellets of feed. The flightings allow a user to purchase larger feed shapes, as the flightings cut into the feed, preparing it for easy chewing and making the feed pieces smaller.

While this invention has been described as it is currently built, the invention is not limited to the disclosed embodiments, but can be employed in various equivalent arrangements included within the spirit and scope of the claims. For example, the auger-operated game feeder can also employ a common rotating spreader, which could be installed beneath the exit orifice of the flow tube 21. As currently designed the invention sits on the ground, rather than employing a raised construction common in the industry, but the unit could be raised and mounted as many other feeders are, either on a tripod or hanging from a tree.

The invention claimed is:

1. A game feeder for large feed shapes comprising:
   a. a hopper for large feed shapes having a floor having a generally-rectangular aperture disposed therein, sized and shaped to prevent multiple large feed shapes from passing through the aperture intact;
   b. a conveyor tube, disposed beneath the feed hopper, having a generally round cross-section, a central principal axis, an upper surface having a generally-rectangular entry aperture disposed therein at a first end of the conveyor tube, and a floor having an exit aperture disposed therein at a second end of the conveyor tube opposite the first end; and
   c. an auger screw, disposed within the conveyor tube along the principal central axis thereof, operable to move feed from the first end to the second end, with flights sharpened to cut feed shapes caught between the flights and conveyor tube wall;
   d. wherein the conveyor tube, entry aperture and auger screw are shaped and sized to prevent the movement of large feed shapes intact.

2. The game feeder of claim 1, wherein the entry aperture of the conveyor tube comprises a shearing edge orthogonal to the central principal axis of the conveyor tube, operable to shear large feed shapes into smaller pieces as the auger moves feed pieces from the first end to the second end.

3. The game feeder of claim 1 wherein the game feeder comprises a programmable controller operable to be programmed with a feeding schedule.

4. The large feed game feeder of claim 1 wherein the game feeder comprises a battery.

5. A method of feeding game with feed formed into large feed shapes, the method comprising:
   a. providing a game feeder for large feed shapes comprising a large feed hopper, a conveyor tube, an auger screw and a programmable controller;
   b. filling the large feed hopper with feed formed into large shapes; and
   c. powering the auger to move feed from the first end to the second end, with flights that cut feed shapes caught between the flights and conveyor tube wall during travel, according to a set schedule stored in the programmable controller, to break up the large feed shapes and dispense them.

6. The method of claim 5 wherein the feed hopper has a floor having a generally-rectangular exit aperture disposed therein sized and shaped to prevent passage of multiple large feed shapes through the aperture intact.

7. The method of claim 5 wherein the conveyor tube is disposed beneath the feed hopper, having a generally round cross-section, a central principal axis, an upper surface having a generally-rectangular entry aperture disposed therein at a first end of the conveyor tube, and a floor having an exit aperture disposed therein at a second end of the conveyor tube opposite the first end.

8. The method of claim 7 wherein the auger screw is disposed within the conveyor tube along the principal central axis thereof, operable to move feed from the first end to the second end.

9. The method of claim 7 wherein the generally round entry aperture of the conveyor tube comprises a shearing edge orthogonal to the principal axis of the conveyor tube, operable to shear large feed shapes into smaller pieces as the auger moves the feed pieces from the first end to the second end.

\* \* \* \* \*